US012703425B2

(12) United States Patent
Watanabe

(10) Patent No.: US 12,703,425 B2
(45) Date of Patent: Aug. 11, 2026

(54) DRIVING ASSISTANCE DEVICE

(71) Applicant: AISIN CORPORATION, Kariya (JP)

(72) Inventor: Kazuya Watanabe, Kariya (JP)

(73) Assignee: AISIN CORPORATION, Kariya (JP)

( * ) Notice: Subject to any disclaimer, the term of this patent is extended or adjusted under 35 U.S.C. 154(b) by 17 days.

(21) Appl. No.: 18/607,706

(22) Filed: Mar. 18, 2024

(65) Prior Publication Data

US 2024/0326913 A1 Oct. 3, 2024

(30) Foreign Application Priority Data

Mar. 29, 2023 (JP) ................................ 2023-053190

(51) Int. Cl.
*B62D 15/02* (2006.01)
*B60R 1/00* (2022.01)

(52) U.S. Cl.
CPC ............ *B62D 15/029* (2013.01); *B60R 1/003* (2013.01); *B62D 15/021* (2013.01); *B60R 2300/8086* (2013.01)

(58) Field of Classification Search
CPC ............... B62D 15/029; B62D 15/021; B62D 15/0275; B60R 1/003; B60R 2300/8086; B60R 1/26; B60R 1/27; B60D 1/06; B60D 1/36; B60D 1/62
See application file for complete search history.

(56) References Cited

U.S. PATENT DOCUMENTS 7,777,615 B2 * 8/2010 Okuda ..................... B60D 1/36 340/687
8,384,782 B2 * 2/2013 Hiroshi ................. G06T 3/4038 340/435
9,290,204 B2 * 3/2016 Lavoie .................. B60W 40/00
9,517,668 B2 * 12/2016 Lavoie ................... B60D 1/305
2002/0145663 A1 10/2002 Mizusawa et al.
2008/0129756 A1 * 6/2008 Iwano ....................... B60R 1/26 348/148

(Continued)

FOREIGN PATENT DOCUMENTS

JP 2002-312768 A 10/2002

*Primary Examiner* — Kurt Philip Liethen
(74) *Attorney, Agent, or Firm* — Sughrue Mion, PLLC

(57) ABSTRACT

A driving assistance device configured to assist a driver of a towing vehicle in vehicle operation includes: a captured image acquisition unit configured to acquire a captured image of a periphery of the towing vehicle, the captured image captured by an image capture device of the towing vehicle; an overhead image generation unit configured to, based on the captured image, generate an overhead image from above onto the periphery of the towing vehicle; a point calculation unit configured to calculate, in the overhead image, a position of a connection point for connecting a hitch ball of the towing vehicle with a coupler of a towed vehicle as an object to be towed by the towing vehicle; and an image display unit configured to display, on an image display device in the towing vehicle, the overhead image having an icon superimposed on the position of the connection point as an assistance image for assisting the driver in vehicle operation. In the driving assistance device, the point calculation unit calculates the position of the connection point in the overhead image based on a positional relationship between the image capture device and the hitch ball.

3 Claims, 11 Drawing Sheets

(56) References Cited

U.S. PATENT DOCUMENTS

2008/0180526 A1* 7/2008 Trevino .................. B60D 1/36
348/E7.086
2010/0245578 A1* 9/2010 Kakinami ............ G06V 20/586
348/148
2014/0125795 A1* 5/2014 Yerke ...................... B60R 1/003
348/118
2014/0324295 A1* 10/2014 Lavoie .................... B60R 1/003
701/41
2016/0023526 A1* 1/2016 Lavoie ................. B62D 15/027
701/41
2018/0253106 A1* 9/2018 Inui ................. B60W 30/18009
2018/0312022 A1* 11/2018 Mattern .......... B60W 30/18036
2018/0361929 A1* 12/2018 Zhang .................... B60D 1/366
2019/0084620 A1* 3/2019 Zhang ................ B62D 15/0295
2019/0172218 A1* 6/2019 Maruoka ................... G06T 7/20
2020/0001855 A1* 1/2020 Watanabe ................ B60D 1/62
2020/0019182 A1* 1/2020 Ling ........................ B60D 1/62
2020/0023696 A1* 1/2020 Ling ......................... B60R 1/26
2020/0317267 A1* 10/2020 Maruoka ................... G06T 1/00
2021/0127550 A1* 5/2021 Ohrstrom ............. A01B 69/006

* cited by examiner

1
DRIVING ASSISTANCE DEVICE
21
VEHICLE INFORMATION DB
23
DRIVING ASSISTANCE ECU
32
RAM
31
CPU
33
34
FLASH MEMORY
ROM
OPERATION UNIT
LIQUID CRYSTAL DISPLAY
SPEAKER
CAN OR THE LIKE
REAR CAMERA
VEHICLE CONTROL ECU
VEHICLE SPEED SENSOR
STEERING SENSOR
SHIFT POSITION SENSOR
14
15
16
9
24
25
26
27

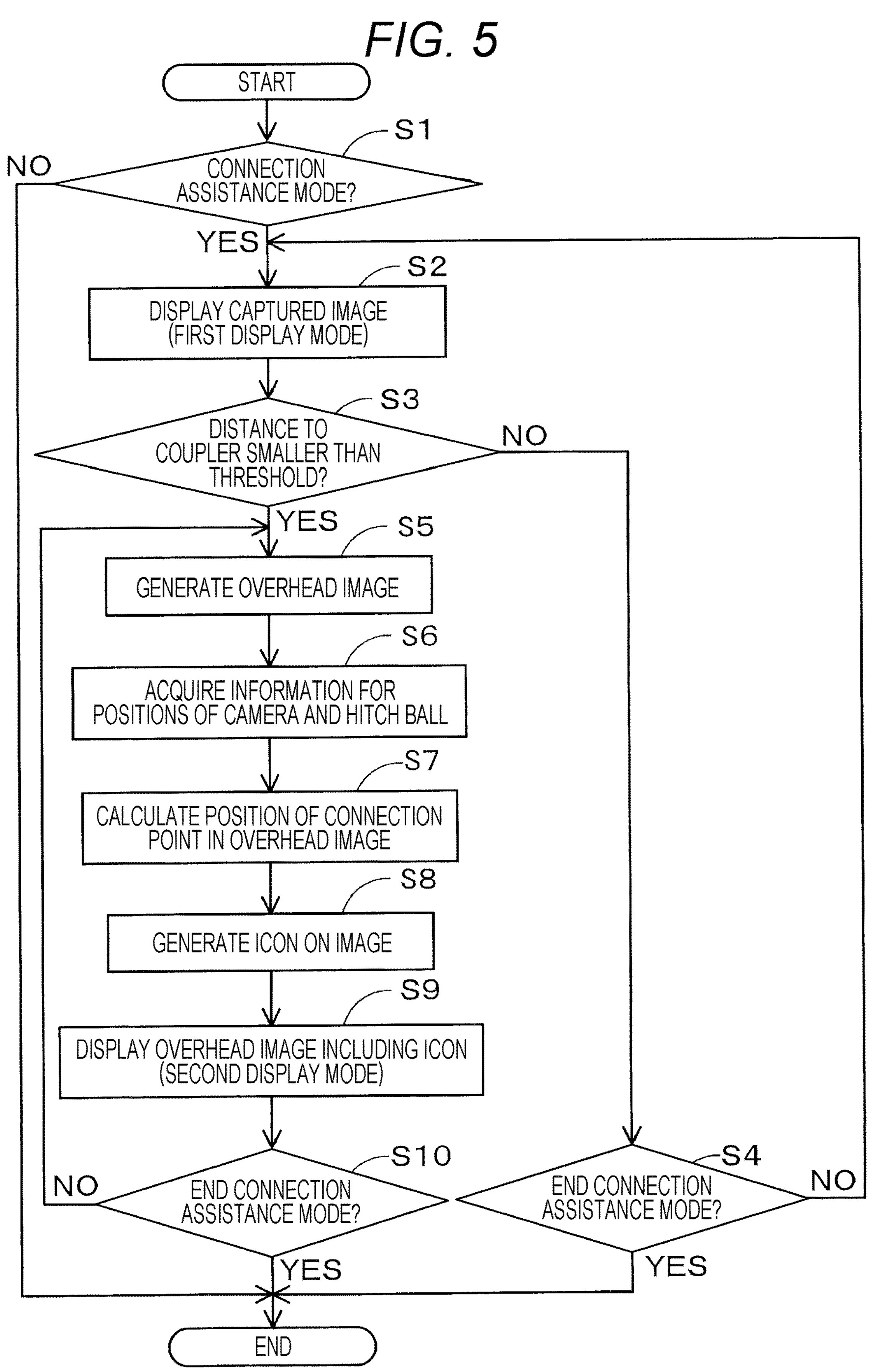
FIG. 5
START
S1
CONNECTION ASSISTANCE MODE?
NO
YES
S2
DISPLAY CAPTURED IMAGE (FIRST DISPLAY MODE)
S3
DISTANCE TO COUPLER SMALLER THAN THRESHOLD?
NO
YES
S5
GENERATE OVERHEAD IMAGE
S6
ACQUIRE INFORMATION FOR POSITIONS OF CAMERA AND HITCH BALL
S7
CALCULATE POSITION OF CONNECTION POINT IN OVERHEAD IMAGE
S8
GENERATE ICON ON IMAGE
S9
DISPLAY OVERHEAD IMAGE INCLUDING ICON (SECOND DISPLAY MODE)
S10
END CONNECTION ASSISTANCE MODE?
NO
YES
S4
END CONNECTION ASSISTANCE MODE?
NO
YES
END

SMALLER THAN
THRESHOLD
1
2
3
4
5
6
7
9

FIG. 12
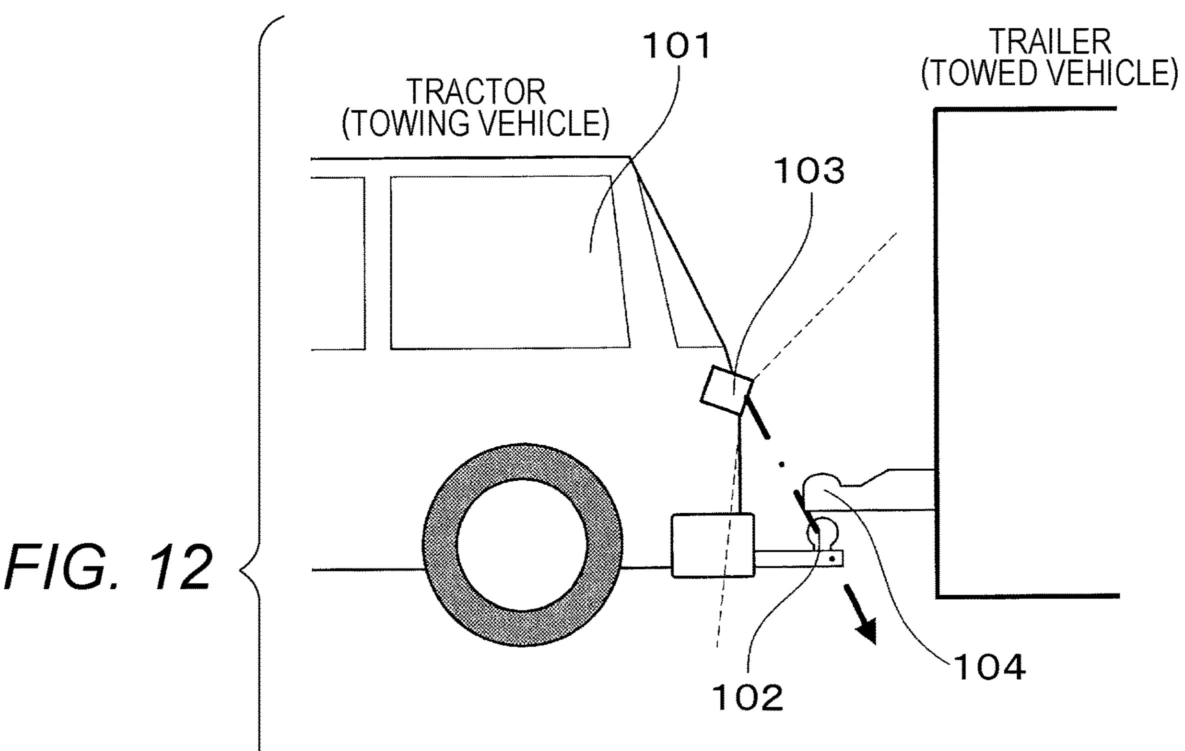
AT POSITION WHERE COUPLER 104 ACTUALLY OVERLAPS HITCH BALL 102, IN CAPTURED IMAGE, COUPLER 104 APPEARS NOT TO OVERLAP HITCH BALL 102.
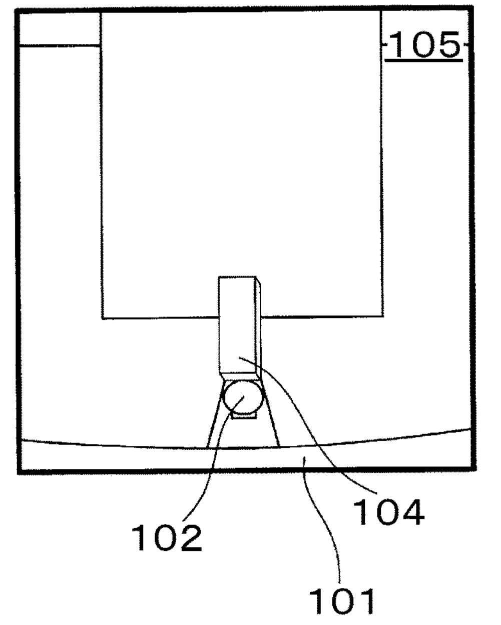

DRIVING ASSISTANCE DEVICE

CROSS REFERENCE TO RELATED APPLICATIONS

This application is based on and claims priority under 35 U.S.C. § 119 to Japanese Patent Application No. 2023-053190, filed on Mar. 29, 2023, the entire content of which is incorporated herein by reference.

TECHNICAL FIELD

This disclosure relates to a driving assistance device configured to assist in driving of a vehicle.

BACKGROUND DISCUSSION

Conventionally, there is known a towing vehicle (tractor) to tow a towed vehicle (trailer). The towing vehicle has, at its rear, a hitch ball, and the towed vehicle has, at its front, a coupler. Here, the hitch ball needs to be physically connected to the coupler such that the towing vehicle tows the towed vehicle. In order to connect the hitch ball with the coupler, generally, a driver of the towing vehicle reverses the towing vehicle to move the hitch ball to a position aligned with the coupler of the towed vehicle being stationary.

However, an area at the rear of the vehicle is a blind spot for the driver and thus, an advanced driving technique is required of the driver to position the hitch ball to be aligned with the coupler while reversing the towing vehicle. In view of these issues, there is a proposed technique to facilitate positioning of a hitch ball of a towing vehicle with a coupler of a towed vehicle, as disclosed in Japanese Patent Application Publication No. 2002-312768. In the proposed technique, the towing vehicle has a camera for capturing an image at rear of the towing vehicle, and a captured image (captured by the camera) is to be displayed on a display in the towing vehicle. The image includes a guide line to indicate a position of the hitch ball, in other words, a point at which the coupler needs to be positioned to be connected with the hitch ball (hereinafter, the point will be referred to as a "connection point").

Here, with the technique disclosed in Japanese Patent Application Publication No. 2002-312768, the position of the hitch ball in the captured image captured by the camera is considered as the position of the connection point. In reality, however, the position of the hitch ball in the captured image has a gap from the position of the connection point. In other words, as illustrated in FIG. 12, a hitch ball 102 protrudes rearward from a towing vehicle 101 and thus, a camera 103 of the towing vehicle 101 cannot be provided immediately above the hitch ball 102 and is to obliquely capture the image of the hitch ball 102. As a result, as illustrated in FIG. 12, even when a coupler 104 is positioned to overlap the hitch ball 102, in other words, even when the coupler 104 is positioned at the connection point where the coupler 104 needs to be to be connected with the hitch ball 102, the coupler 104 appears not to reach the connection point in a captured image 105.

In an example of FIG. 12, the camera 103 is off a position immediately above the hitch ball 102 in a front-to-rear direction. Similarly, when the camera 103 is off the position in a left-to-right direction, in reality, the position of the hitch ball 102 in the captured image 105 has a gap from the position of the connection point.

A need thus exists for a driving assistance device which is not susceptible to the drawback mentioned above.

SUMMARY

A driving assistance device configured to assist a driver of a towing vehicle in vehicle operation includes: a captured image acquisition unit configured to acquire a captured image of a periphery of the towing vehicle, the captured image captured by an image capture device of the towing vehicle; an overhead image generation unit configured to, based on the captured image, generate an overhead image from above onto the periphery of the towing vehicle; a point calculation unit configured to calculate, in the overhead image, a position of a connection point for connecting a hitch ball of the towing vehicle with a coupler of a towed vehicle as an object to be towed by the towing vehicle; and an image display unit configured to display, on an image display device in the towing vehicle, the overhead image having an icon superimposed on the position of the connection point as an assistance image for assisting the driver in vehicle operation. In the driving assistance device, the point calculation unit calculates the position of the connection point in the overhead image based on a positional relationship between the image capture device and the hitch ball.

BRIEF DESCRIPTION OF THE DRAWINGS

The foregoing and additional features and characteristics of this disclosure will become more apparent from the following detailed description considered with the reference to the accompanying drawings, wherein:

FIG. 5 is a flowchart of a driving assistance processing program according to this embodiment;

FIG. 12 is a diagram illustrating a problem in the prior art.

DETAILED DESCRIPTION

Figure 1:
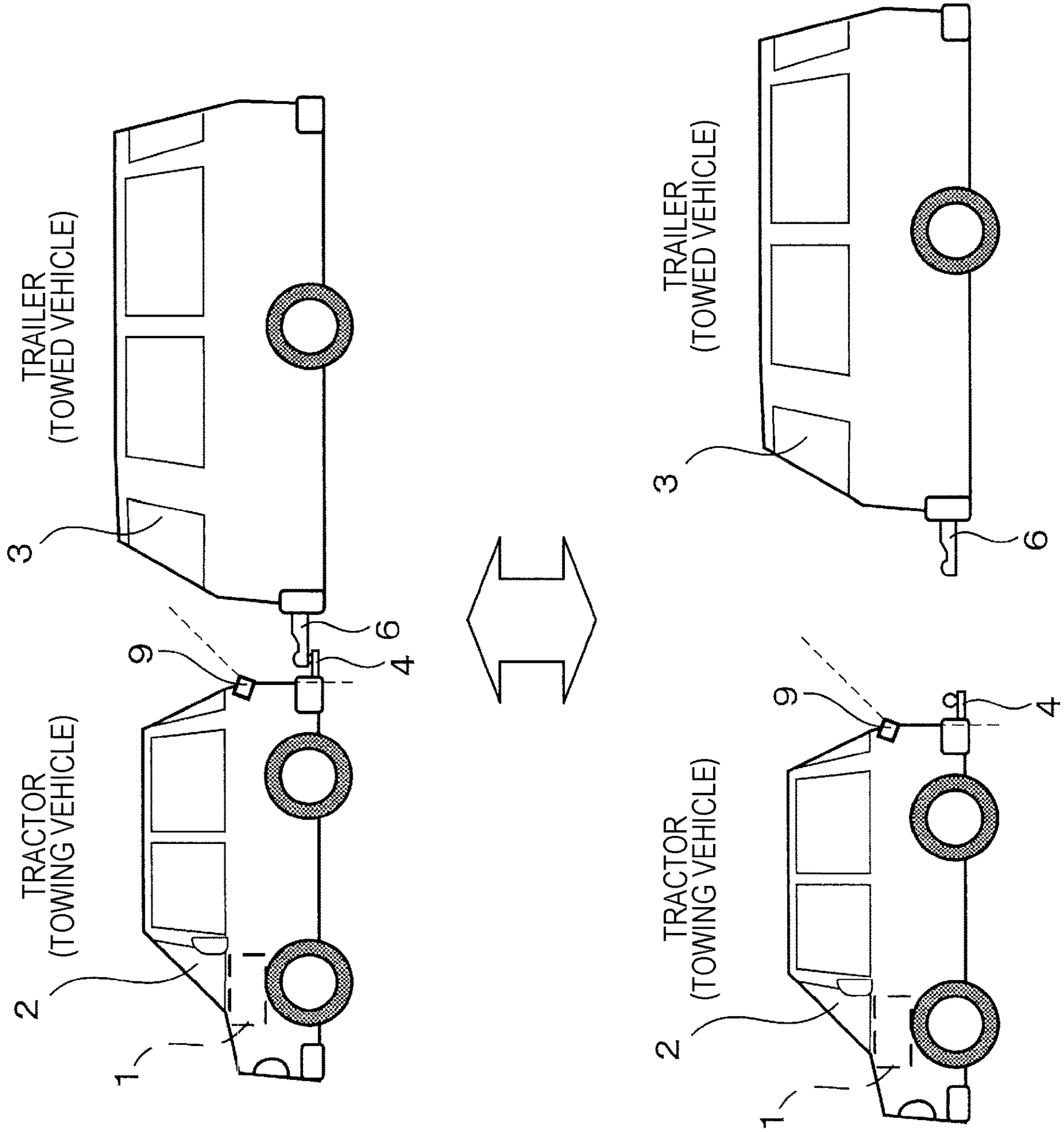
FIG. 1 is a diagram illustrating a towing vehicle and a towed vehicle according to this embodiment.

A driving assistance device according to an embodiment of this disclosure will be described with reference to the attended drawings. First, a towing vehicle (tractor) 2 including a driving assistance device 1 according to this embodiment, and a towed vehicle (trailer) 3 to be towed by the towing vehicle 2 will be described. FIG. 1 includes two diagrams illustrating the towing vehicle 2 and the towed vehicle 3; and in the upper one, the towing vehicle 2 is connected with the towed vehicle 3, while in the lower one, the towing vehicle 2 is not yet connected with and still away from the towed vehicle 3.

The towing vehicle 2 is also referred to as a tractor, and configured to travel while towing the towed vehicle 3. The towing vehicle 2 may be, for example, an automobile (internal combustion automobile) using an internal combustion engine (e.g., an engine) as a drive source, an automobile (e.g., an electric automobile or a fuel-cell automobile) using an electric motor (e.g., a motor) as a drive source, or an automobile (hybrid automobile) using the internal combustion engine and the electric motor as drive sources. Further, the towing vehicle 2 may be any vehicle type. As long as a towing device 4 (described later) is included, the towing vehicle 2 may be an ordinary car or may be a large commercial tractor (trailer head).

As illustrated in FIG. 1, the towing vehicle 2 includes a rear bumper, and the towing device (a hitch) 4 protrudes from, for example, a lower center portion of the rear bumper in a vehicle width direction of the towing vehicle 2, so as to tow the towed vehicle 3.

Figure 2:
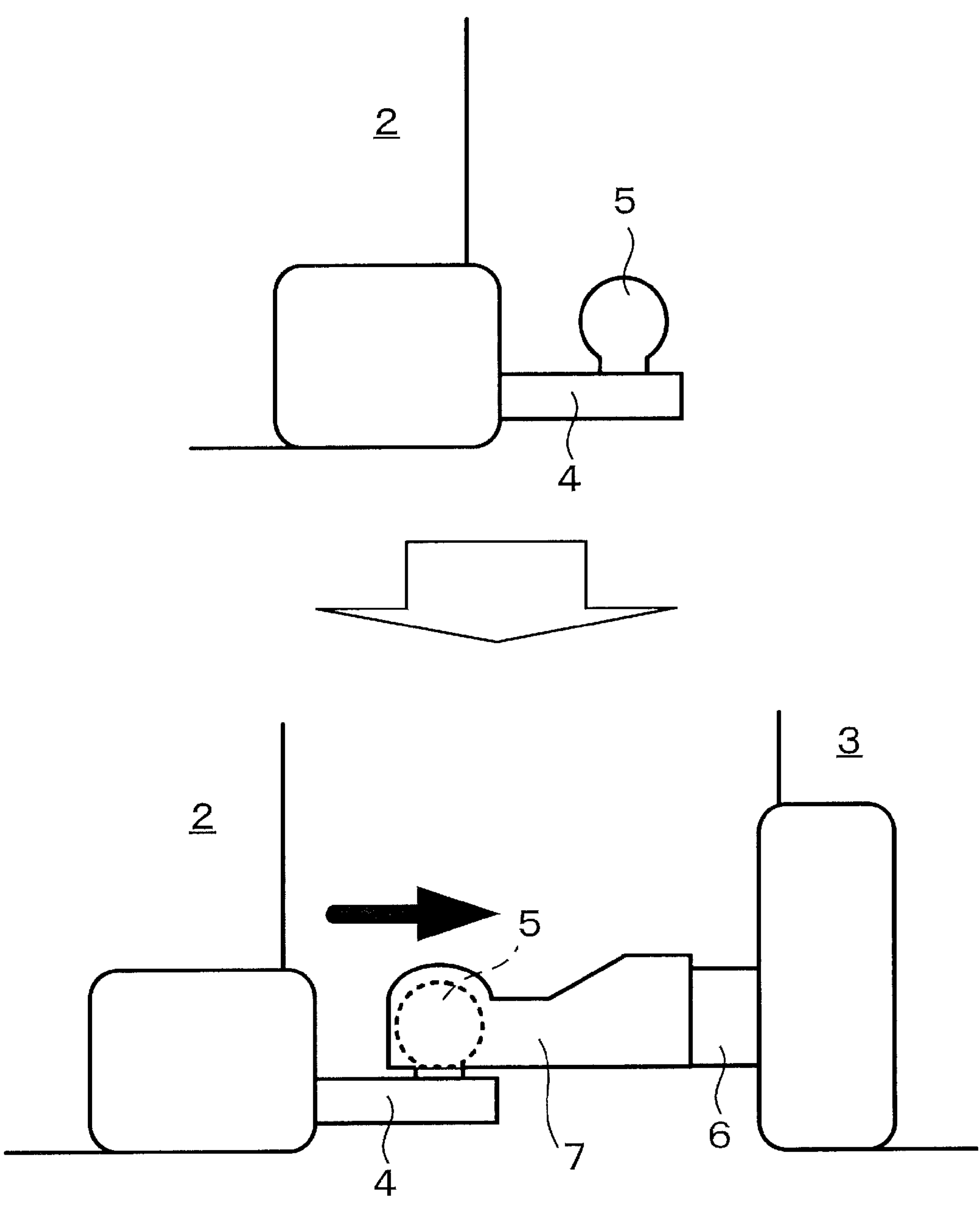
FIG. 2 is a diagram of an enlarged view of a periphery of a towing device in the towing vehicle.

FIG. 2 is a diagram of an enlarged view of a periphery of the towing device 4.

As illustrated in FIG. 2, the towing device 4 is fixed to, for example, a frame of the towing vehicle 2. As an example, the towing device 4 includes a hitch ball 5 having a tip of a spherical shape placed vertically (in a direction of top to bottom of the towing vehicle); and the towed vehicle 3 has a connection member 6 fixed thereto, and has a coupler 7 at a tip of the connection member 6. Then, when the hitch ball 5 is covered by the coupler 7, the hitch ball 5 is to be connected with the coupler 7, causing the towing vehicle 2 to be connected with the towed vehicle 3. Note that, as long as the towing vehicle 2 is connectable with the towed vehicle 3, the hitch ball 5 and the coupler 7 may have any other shapes in addition to shapes in FIG. 2.

Figure 3:
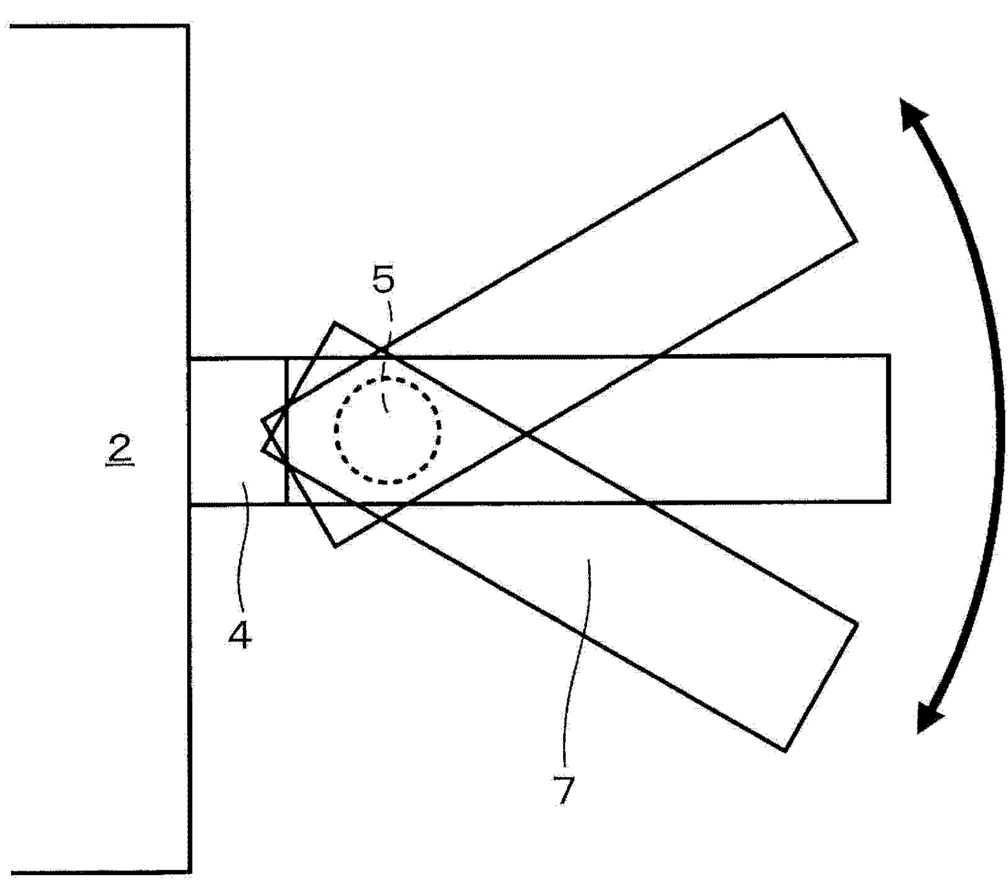
FIG. 3 is a diagram illustrating movements of the towing vehicle and the towed vehicle when a hitch ball and a coupler are connected.

When the hitch ball 5 is connected with the coupler 7, the hitch ball 5 is to transmit, to the towed vehicle 3 (connection member 6), front-to-rear and left-to-right movements in accordance with the movement of the towing vehicle 2. Further, as illustrated in FIG. 3, even when the coupler 7 is connected with the hitch ball 5, the coupler 7 is displaceable to the hitch ball 5 at a free angle (with an upper limit angle specified). Thus, the towed vehicle 3 is swingable (pivotable) to the towing vehicle 2 in the vehicle width direction.

Concurrently, as illustrated in FIG. 1, a rear camera (image capture device) 9 is provided in a wall of a rear hatch at rear of the towing vehicle 2. The rear camera 9 is, for example, a digital camera including an image capture element, such as a CCD or CIS camera. The rear camera 9 outputs moving image data (captured image data) at a predetermined frame rate. The rear camera 9 has a wide-angle lens or a fisheye lens, has its optical axis direction directed obliquely downward, and captures images within a range of, for example, 140 to 220 degrees in a horizontal direction. This configuration allows, with the towed vehicle 3 being not connected with the towing vehicle 2, the rear camera 9 to output the captured image data of a rear periphery of the towing vehicle 2 captured at a wide angle including a road surface.

The rear camera 9 also captures the images of at least the towing device 4 and the hitch ball 5 at a rear end of the towing vehicle 2. Also, even when the towed vehicle 3 is not connected with the towing vehicle 2, as long as the towed vehicle 3 is near the rear of the towing vehicle 2, the rear camera 9 captures the images of the towed vehicle 3, together with the connection member 6 and the coupler 7 of the towed vehicle 3. The captured image data captured by the rear camera 9 can be used for recognizing the towed vehicle 3 in addition to, for example, detecting the connection state of the towing vehicle 2 with the towed vehicle 3 (such as the connection angle or whether or not the towing vehicle 2 is connected with the towed vehicle 3). Particularly, in this embodiment, in a connection assistance mode for assisting the connection between the towing vehicle 2 and the towed vehicle 3 as will be described later, the captured image data is also used for detecting a distance between the towing vehicle 2 and the coupler 7 of the towed vehicle 3, and detecting a position of a connection point for connecting the hitch ball 5 of the towing vehicle 2 with the coupler 7 of the towed vehicle 3. In the connection assistance mode, the captured image data captured by the rear camera 9 is displayed on a display in the towing vehicle 2, so as to be viewable to an occupant. Further, the captured image data captured by the rear camera 9 is used for generating an overhead image from above onto the periphery of the towing vehicle. A process in which the overhead image is generated will be described in detail later.

The towed vehicle 3 is also referred to as a trailer, and travels while being towed by the towing vehicle 2. Thus, unlike the towing vehicle 2, the towed vehicle 3 does not basically include an engine or a motor as its drive source. The towed vehicle 3 corresponds to, for example, a camping trailer having a living space therein, or a light trailer for carrying a car or a ship. The towed vehicle 3 includes a main body, a plurality of (two in this embodiment) trailer wheels, the connection member 6, and the coupler 7.

Here, as illustrated in FIG. 1, the connection member 6 is provided at a lower center portion of the main body in the vehicle width direction of the towed vehicle 3, and protrudes forward (in a traveling direction) from a front end of the main body.

As illustrated in FIG. 2, the coupler 7 is placed at a front end of the connection member 6, and has a spherical recess for covering the hitch ball 5. When the coupler 7 covers the hitch ball 5, as has been described above, the towed vehicle 3 is pivotably connected to the towing vehicle 2 (see FIG. 3). Here, a length of the connection member 6 and a height of the connection member 6 from a ground surface (in other words, a position of the coupler 7 in the towed vehicle 3) vary in accordance with a type of the towed vehicle 3. In this embodiment, the coupler 7 is placed at, at least, a position connectable to the hitch ball 5 of the towing vehicle 2.

Figure 4:
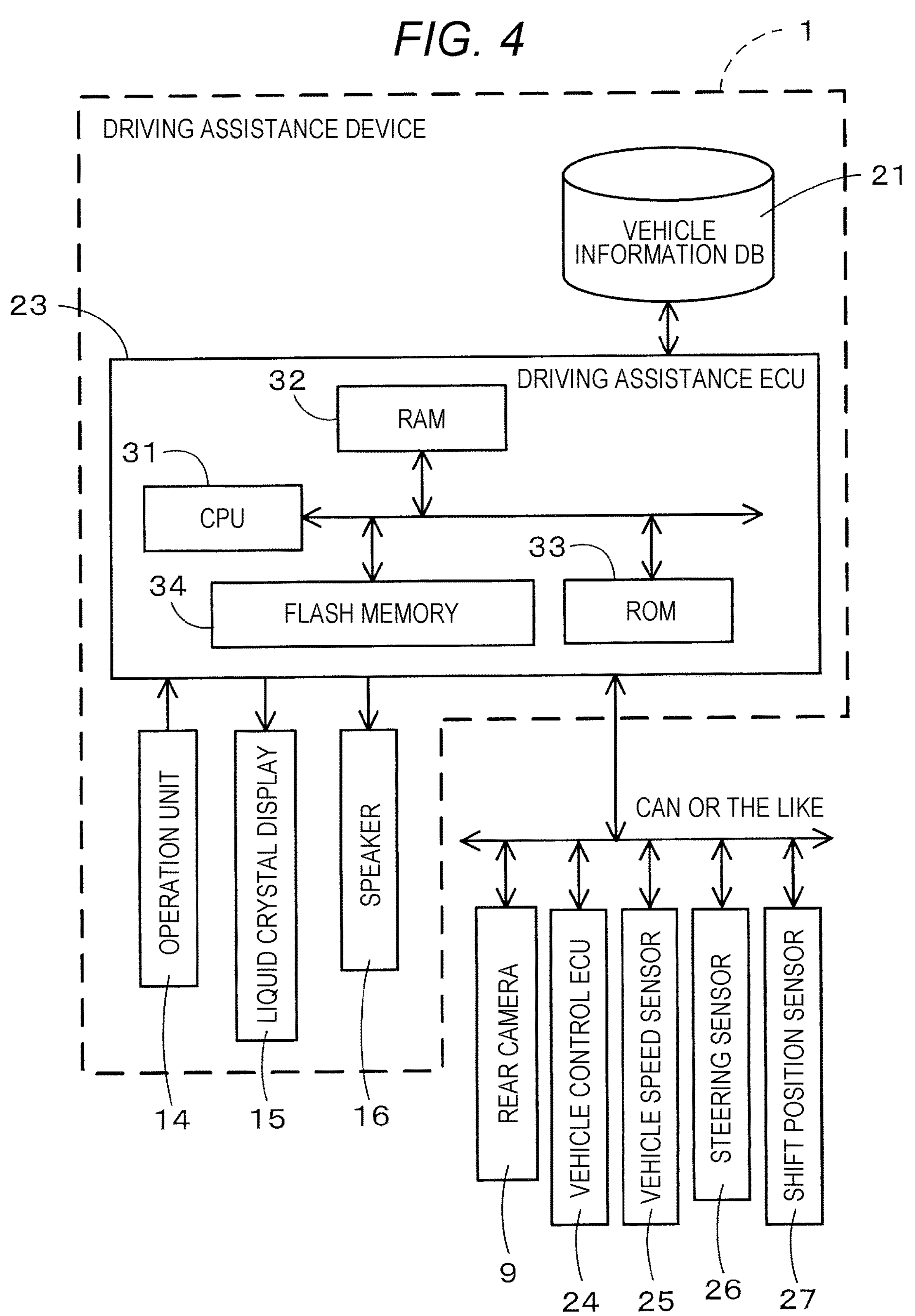
FIG. 4 is a block diagram of a configuration of a driving assistance device according to this embodiment.

Next, the driving assistance device 1 included in the towing vehicle 2 will be described. The driving assistance device 1 is configured to assist a driver of the towing vehicle 2 in vehicle operation when the driver reverses the towing vehicle 2 to connect the towing vehicle 2 with the towed vehicle 3. FIG. 4 is a block diagram of a configuration of the driving assistance device 1 according to this embodiment.

As seen in FIG. 4, the driving assistance device 1 according to this embodiment includes an operation unit 14, a liquid crystal display 15, a speaker 16, a vehicle information DB 21, and a driving assistance electronic control unit (ECU) 23. The operation unit 14 receives an operation from the occupant of the towing vehicle 2; the liquid crystal display 15 displays the captured image captured by the rear camera 9 and other driving assistance information for the occupant of the towing vehicle 2; the speaker 16 outputs audio guidance related to the driving assistance; the vehicle information DB 21 stores various data related to the towing vehicle 2 and towed vehicle 3; and the driving assistance ECU 23 performs various computation based on the input information. The driving assistance device 1 is connected, through an on-vehicle network such as CAN, to the rear camera 9 placed in the towing vehicle 2, a vehicle control ECU 24 for various control of the towing vehicle 2, and various sensors such as a vehicle speed sensor 25, a steering sensor 26, and a shift position sensor 27.

The operation unit 14 is placed on an instrument panel or a handle of the towing vehicle 2, and is operated during, for example, a transition operation to the connection assistance mode (described later) or inputs of various parameters related to the towing vehicle 2 and the towed vehicle 3. The operation unit 14 includes a plurality of operation switches (not illustrated) such as various keys and buttons.

The driving assistance ECU 23 controls various operations corresponding to switch signals output by pressing the plurality of operation switches. The operation unit 14 may have a touch panel on a front surface of the liquid crystal display 15. The operation unit 14 may also have a microphone and an audio recognition device.

The liquid crystal display 15 is placed on the instrument panel of the towing vehicle 2, and displays the captured image data captured by the rear camera 9 during the transition operation to the connection assistance mode for assisting the connection between the towing vehicle 2 and the towed vehicle 3. Further, when a predetermined condition is satisfied, the liquid crystal display 15 also displays the overhead image generated based on the captured image data. The liquid crystal display 15 may also be used for a navigation device.

The speaker 16 outputs, during the transition operation to the connection assistance mode, the audio guidance or the like for guiding the travel based on commands from the driving assistance ECU 23. The speaker 16 may also be used for the navigation device.

The vehicle information DB 21 is storing means that stores various information related to the towing vehicle 2 and the towed vehicle 3. With regard to the towing vehicle 2, the vehicle information DB 21 stores, for example, a position (a height from the ground surface, a position in a left-to-right direction, and a distance from the rear end of the towing vehicle 2) and the optical axis direction of the rear camera 9, and a position (a height from the ground surface and a distance from the rear end of the towing vehicle 2) of the hitch ball 5, together with an entire length, a vehicle width, a wheel base, and a minimum pivoting radius of the towing vehicle 2. With regard to the towed vehicle 3, the vehicle information DB 21 stores, for example, the position (a height from the ground surface and a distance from the tip of the towed vehicle 3) of the coupler 7, together with an entire length, a vehicle width, a wheel base, and a minimum pivoting radius of the towed vehicle 3. These pieces of information may be previously input by the occupant or someone from the vehicle manufacturer via the operation unit 14, or values detected by the rear camera 9 or various sensors may be automatically input. Note that, the towed vehicle 3 is not necessarily restrictive and thus, when the towed vehicle 3 (as an object to be towed by the towing vehicle 2) is changed, the parameters described above need to be changed too. As a storage medium of the vehicle information DB 21, for example, a memory card may be used. Alternatively, a storage area (e.g., RAM or flash memory) in the driving assistance ECU 23 may be used.

The driving assistance ECU 23 is an electronic control unit having control overall of the driving assistance device 1, and includes a CPU 31 as a computing device and a control device, and internal storage devices such as a RAM 32, a ROM 33, and a flash memory 34. The RAM 32 is used as working memory when the CPU 31 performs the various computation, and stores route data of searched routes and others. The ROM 33 stores a control program, a driving assistance program (see FIG. 5; described later), and others. The flash memory 34 stores a program read from the ROM 33. The driving assistance ECU 23 includes various control units as processing algorithms. For example, a captured image acquisition unit acquires the captured image of the periphery of the towing vehicle 2 captured by the rear camera 9 of the towing vehicle 2. Based on the captured image, an overhead image generation unit generates the overhead image from above onto the periphery of the towing vehicle 2. A point calculation unit calculates, in the overhead image, the position of the connection point for connecting the hitch ball 5 of the towing vehicle 2 with the coupler 7 of the towed vehicle 3 as the object to be towed by the towing vehicle 2. An image display unit displays, on the liquid crystal display 15 in the towing vehicle 2, the overhead image having an icon superimposed on the position of the connection point as an assistance image for assisting the driver in vehicle operation.

The vehicle control ECU 24 is an electronic control unit having control of the towing vehicle 2. The vehicle control ECU 24 is connected to drive units of the towing vehicle 2 such as a steering wheel, a brake, and an accelerator. In this embodiment, for example, during the transition operation to the connection assistance mode (described later) or during other transition operations such as a transition operation to a parking assistance mode, the vehicle control ECU 24 may control each of the drive units to assist automatic driving of the towing vehicle 2. Specifically, during the connection assistance mode or during the parking assistance mode, the driving assistance ECU 23 transmits, to the vehicle control ECU 24 through the CAN, various assistance information related to the automatic driving assistance, which has been generated in the driving assistance device 1. Then, the vehicle control ECU 24 uses the various assistance information received to assist the automatic driving after the towing vehicle 2 starts traveling. Examples of the various assistance information include a travel locus recommended for the towing vehicle 2 and the towed vehicle 3, and information indicating a vehicle speed and a steering angle when traveling along the travel locus recommended. In the automatic driving assistance, only the steering operation may be automatic, or the drive source control and the braking control may be automatic too. Alternatively, the towing vehicle 2 may not necessarily include the automatic driving assistance, but may be configured for manual driving only.

The vehicle speed sensor 25 is an active wheel speed sensor attached to a wheel of the towing vehicle 2, and detects rotational speed of the wheels to output a speed signal. The steering sensor 26 is attached inside a steering device, and detects the steering angle when the steering wheel is steered to output a steering angle signal. The shift position sensor 27 is built in a shift lever, and detects whether the shift lever is positioned at "P (parking)", "N (neutral)", "R (reverse)", "D (drive)", "2 (second gear)", or "L (low)".

The driving assistance ECU 23 is configured to acquire the current vehicle speed, travel distance, steering angle, shift lever position, and others of the towing vehicle 2 based on the signals output from the various sensors.

In the driving assistance device 1 with these configurations, a driving assistance processing program executed by the driving assistance ECU 23 will be described with reference to FIG. 5. FIG. 5 is a flowchart of the driving assistance processing program according to this embodiment. The driving assistance processing program is executed when an accessory (ACC) power supply for the towing vehicle 2 has been turned on, and assists the driver in the vehicle operation when he/she reverses the towing vehicle 2 to connect the towing vehicle 2 with the towed vehicle 3. The program shown in the flowchart of FIG. 5 is stored in the RAM 32 or the ROM 33 of the driving assistance device 1, and is to be executed by the CPU 31.

First, in step (hereinafter, simply referred to as S) 1, the CPU 31 determines whether or not the transition operation to the connection assistance mode for assisting the connection between the towing vehicle 2 and the towed vehicle 3 has taken place. For example, when the shift lever is positioned at "P" or "R" and the occupant of the towing vehicle 2 has operated a predetermined mode transition via the operation unit 14, the transition operation to the connection assistance mode takes place. Alternatively, the shift lever position may be excluded from the mode transition condition above. Further alternatively, "the towed vehicle 3 being not connected with the towing vehicle 2" may be included in the mode transition condition. In order to detect whether or not the towing vehicle 2 is connected with the towed vehicle 3, for example, the captured image captured by the rear camera 9 may be used. Still further alternatively, when the towing vehicle 2 has started reversing while not being connected with the towed vehicle 3, the transition operation to the connection assistance mode may automatically take place.

On determination that the transition operation to the connection assistance mode for assisting the connection between the towing vehicle 2 and the towed vehicle 3 has taken place (S1: YES), the CPU 31 proceeds to S2. On the other hand, on determination that the transition operation to the connection assistance mode has not taken place (S1: NO), the driving assistance processing program ends.

In S2, the CPU 31 outputs, to the liquid crystal display 15, the captured image captured on a real time basis by the rear camera 9 (more specifically, the moving image data (captured image data) captured at the predetermined frame rate) as the assistance image for assisting the driver in vehicle operation (first display mode). As illustrated in FIG. 1, the rear camera 9 is provided in the wall of the rear hatch at the rear of the towing vehicle 2, and the optical axis direction is directed obliquely downward. The rear camera 9 has the wide-angle lens or the fisheye lens, and captures the images within the range of, for example, 140 to 220 degrees in the horizontal direction. This configuration allows, with the towed vehicle 3 being not connected with the towing vehicle 2, the rear camera 9 to output the captured image data of the rear periphery of the towing vehicle 2 captured at the wide angle including the road surface. The captured images captured by the rear camera 9 are to be continuously displayed until the connection assistance mode ends (S4: YES or S9: YES).

Figure 6:
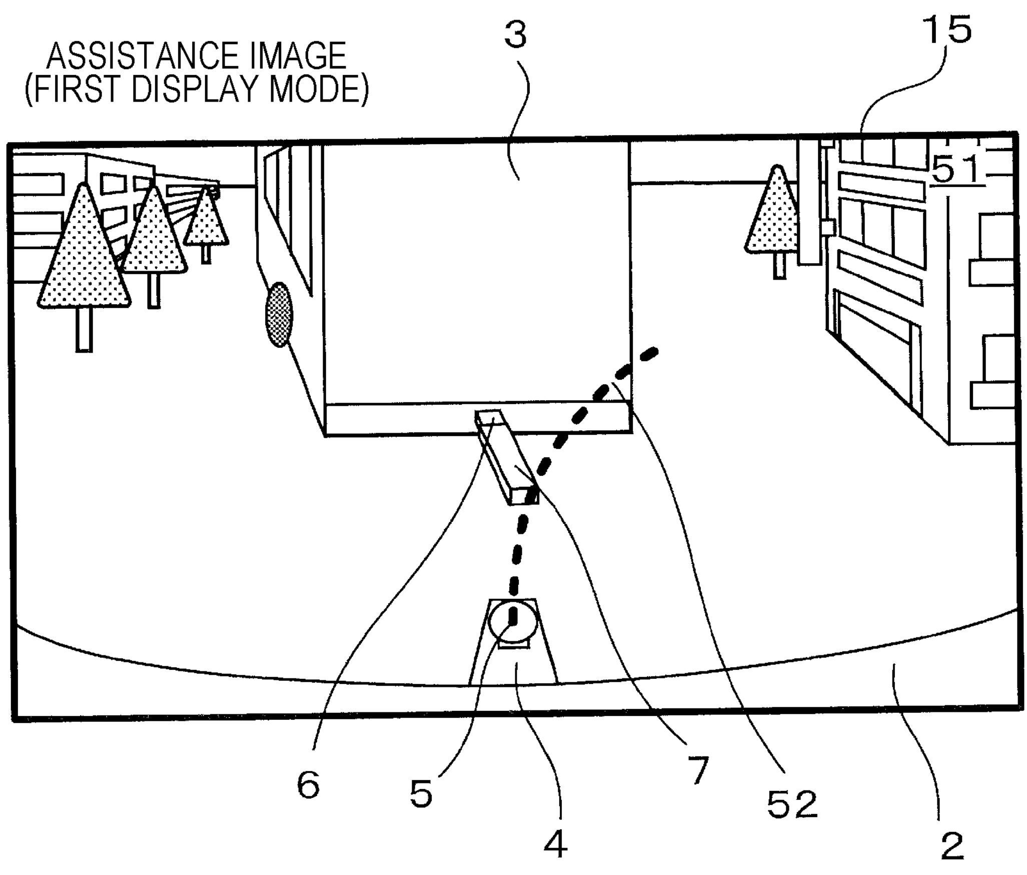
FIG. 6 is a diagram illustrating an example of an assistance image displayed on a liquid crystal display in S2.

FIG. 6 is a diagram illustrating an example of an assistance image 51 displayed on the liquid crystal display 15 in S2. As illustrated in FIG. 6, the assistance image 51 includes at least the towing device 4 and the hitch ball 5 at the rear end of the towing vehicle 2. When the towed vehicle 3 is not connected to the towing vehicle 2 but is near the rear of the towing vehicle 2, as illustrated in FIG. 6, the assistance image 51 also includes the towed vehicle 3, together with the connection member 6 and the coupler 7 of the towed vehicle 3. Here, only a specific area (e.g., an area around the hitch ball 5) may be trimmed from the captured image captured by the rear camera 9, and displayed as the assistance image 51.

Further, the CPU 31 acquires the current steering angle of the towing vehicle 2 based on the steering angle signal from the steering sensor 26, calculates a moving locus 52 expected of the hitch ball 5 based on the current steering angle acquired, and superimposes the moving locus 52 on the assistance image 51 before displaying the assistance image 51. With the moving locus 52 calculated based on the current steering angle, when the driver displaces the steering angle, the moving locus 52 is concurrently displaced on the real time basis. In addition to or instead of the moving locus 52 of the hitch ball 5, a moving locus of a rear wheel area of the towing vehicle 2 may be displayed. The assistance image 51 may not necessarily include the moving locus 52 but may include the captured image only.

The driver of the towing vehicle 2 views the assistance image 51 on the liquid crystal display 15, so as to easily grasp a positional relationship between the hitch ball 5 of the towing vehicle 2 (as the driver's vehicle) and the coupler 7 of the towed vehicle 3 (as the object to be towed by the driver's vehicle). The driver then operates the steering to reverse the towing vehicle 2 to align the position of the hitch ball 5 with the coupler 7, thereby allowing the hitch ball 5 to approach the coupler 7. Particularly, with the moving locus 52 displayed, the driver adjusts the steering angle to cause the moving locus 52 pass through the coupler 7, thereby facilitating the positioning of the hitch ball 5 with the coupler 7.

Figure 7:
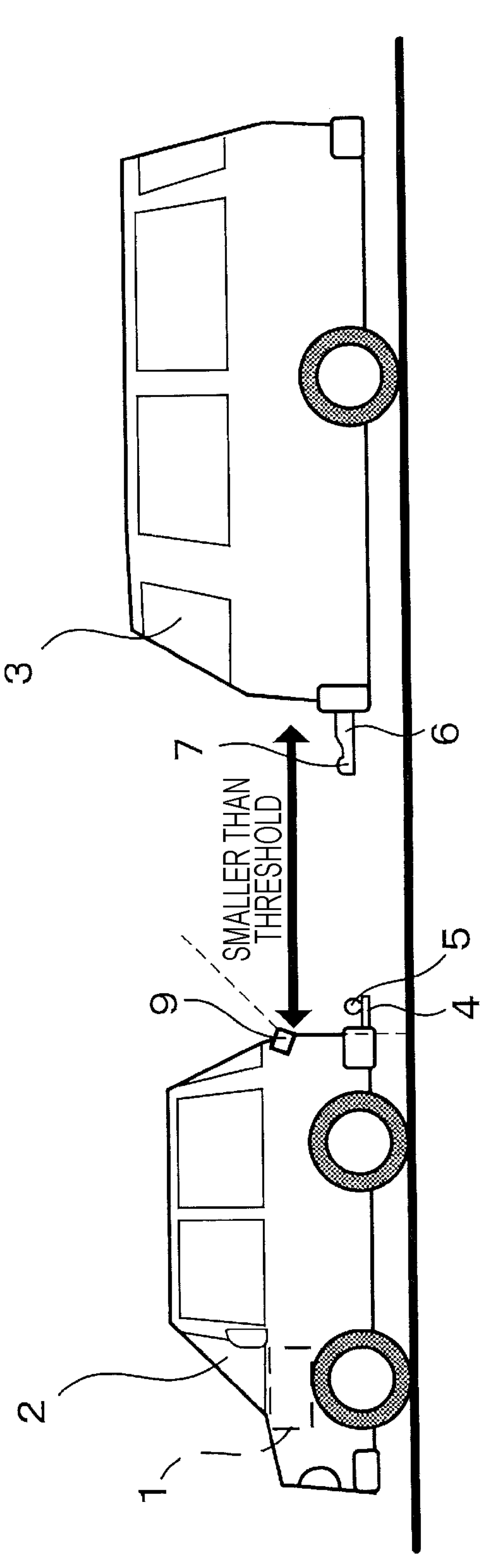
FIG. 7 is a diagram illustrating a distance from the towing vehicle to the coupler, the distance as a condition for displaying an overhead image.

In S3, the CPU 31 determines whether or not the distance from the towing vehicle 2 to the coupler 7 is smaller than a threshold as illustrated in FIG. 7. Alternatively, instead of the distance from the towing vehicle 2 to the coupler 7, a distance from the towing vehicle 2 to the towed vehicle 3 may be used. The distance from the towing vehicle 2 to the coupler 7 or the towed vehicle 3 may be detected by, for example, a sensor or a camera of the towing vehicle 2. Alternatively, a user may select the position of the coupler 7 in the assistance image 51 displayed on the liquid crystal display 15, and a distance to the position selected by the user may be detected. The threshold may be set as appropriate, and here is set to 3 m as an example. Alternatively, the user may set the threshold to any value via the operation unit 14.

On determination that the distance from the towing vehicle 2 to the coupler 7 is smaller than the threshold (S3: YES), the CPU 31 proceeds to S5. On the other hand, on determination that the distance from the towing vehicle 2 to the coupler 7 is equal to or greater than the threshold (S3: NO), the CPU 31 proceeds to S4.

In S4, the CPU 31 determines whether or not to end the connection assistance mode.

Here, the connection assistance mode may end, for example, on condition that the occupant of the towing vehicle 2 executes a predetermined mode end operation via the operation unit 14, or on condition that the shift lever is positioned to "P" or the engine is turned off. Alternatively, the connection assistance mode may end on condition that the towed vehicle 3 has been connected with the towing vehicle 2. In order to detect whether or not the towing vehicle 2 is connected with the towed vehicle 3, for example, the captured image captured by the rear camera 9 may be used.

On determination that the connection assistance mode has ended (S4: YES), the driving assistance processing program ends. On the other hand, on determination that the connection assistance mode has not ended (S4: NO), the CPU 31 returns to S2 to continue to display the assistance image in the first display mode. In other words, in this embodiment, when the distance from the towing vehicle 2 to the coupler 7 is equal to or greater than the threshold, the CPU 31 does not proceed to a second display mode but to continue to display the assistance image in the first display mode.

Note that, even on the determination that the distance from the towing vehicle 2 to the coupler 7 is equal to or greater than the threshold (S3: NO), when the occupant of the towing vehicle 2 agrees to a predetermined operation to display the overhead image, the occupant's intention is desirably prioritized and the CPU 31 proceeds to S5 to display the overhead image. For example, the operation unit 14 includes a button dedicated for switching the captured image to the overhead image as the assistance image displayed on the liquid crystal display 15, and when the button is operated, the CPU 31 is commanded to proceed to S5 even with the distance from the towing vehicle 2 to the coupler 7 being equal to or greater than the threshold.

Figure 8:
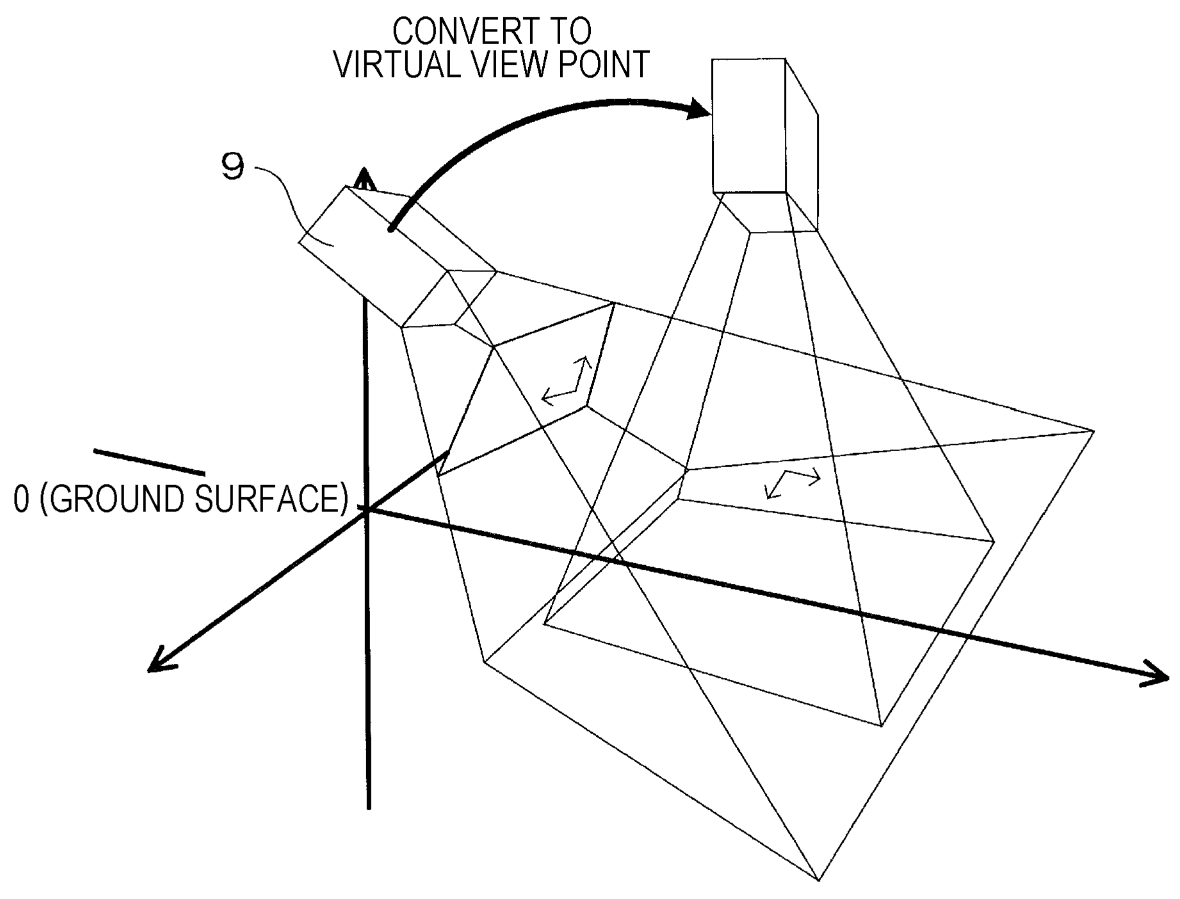
FIG. 8 is a diagram illustrating a method of converting a captured image to the overhead image.

In S5, as illustrated in FIG. 8, the CPU 31 projects the captured image captured on the real time basis by the rear camera 9 on a virtual projection plane as a horizontal plane corresponding to a height of the ground surface. Then the CPU 31 generates the overhead image by converting the captured image projected on the virtual projection plane to an image from a virtual view point from above the towing vehicle 2 directed vertically downward. Here, the virtual projection plane may not be at the height of the ground surface but may be a horizontal plane corresponding to the height of the hitch ball 5 or the coupler 7. Note that, when the virtual projection plane is the horizontal plane corresponding to the height of the hitch ball 5 or the coupler 7, a position of the icon displayed on the connection point (described later) is not necessarily to be corrected (the position of the hitch ball 5 in the overhead image is to correspond to the position of the connection point). The height of the hitch ball 5 or the coupler 7 is stored in the vehicle information DB 21.

In S5, in order to convert the captured image to the image from the virtual view point, the CPU 31 converts each coordinate in a captured image coordinate system set along a plane perpendicular to the optical axis of the rear camera 9, first to the corresponding coordinate in a ground surface coordinate system set along the ground surface, and then to the corresponding coordinate in an overhead image coordinate system. Each conversion formula used here is known, and thus a detailed description thereof will be omitted.

Next, in S6, the CPU 31 acquires information for the position of the hitch ball 5 and the position of the rear camera 9 from the vehicle information DB 21. The vehicle information DB 21 stores the various information related to the towing vehicle 2, such as the position (height from the ground surface, the position in the left-to-right direction, and the distance from the rear end of the towing vehicle 2) and the optical axis direction of the rear camera 9, and the position (height from the ground surface, the position in the left-to-right direction, and the distance from the rear end of the towing vehicle 2) of the hitch ball 5, together with the entire length, the vehicle width, the wheel base, and the minimum pivoting radius of the towing vehicle 2.

Subsequently, in S7, based on the information for the positions of the hitch ball 5 and the rear camera 9 acquired in S6, the CPU 31 calculates the position of the connection point in the overhead image generated in S5. The connection point corresponds to a point at which the coupler 7 of the towed vehicle 3 needs to be positioned to be connected with the hitch ball 5 of the towing vehicle 2, and is thus basically a point at which the coupler 7 is positioned to overlap the hitch ball 5. However, as has been described in FIG. 12 by referring to the prior art, with the rear camera 9 not provided immediately above the hitch ball 5, the position of the hitch ball 5 in the captured image 105 has a gap from the position of the connection point. Thus, the position of the hitch ball 5 in the overhead image generated in S5 also has a gap from the connection point. In S7, in view of the gap, the CPU 31 calculates the position of the connection point in the overhead image generated in S5. Here, as has been described above, when the virtual projection plane of the overhead image is the horizontal plane corresponding to the height of the hitch ball 5 or the coupler 7, the gap can be ignored, and the position of the hitch ball 5 in the overhead image corresponds to the position of the connection point.

A method of calculating the position of the connection point in the overhead image in S7 will be described below.

Figure 9:
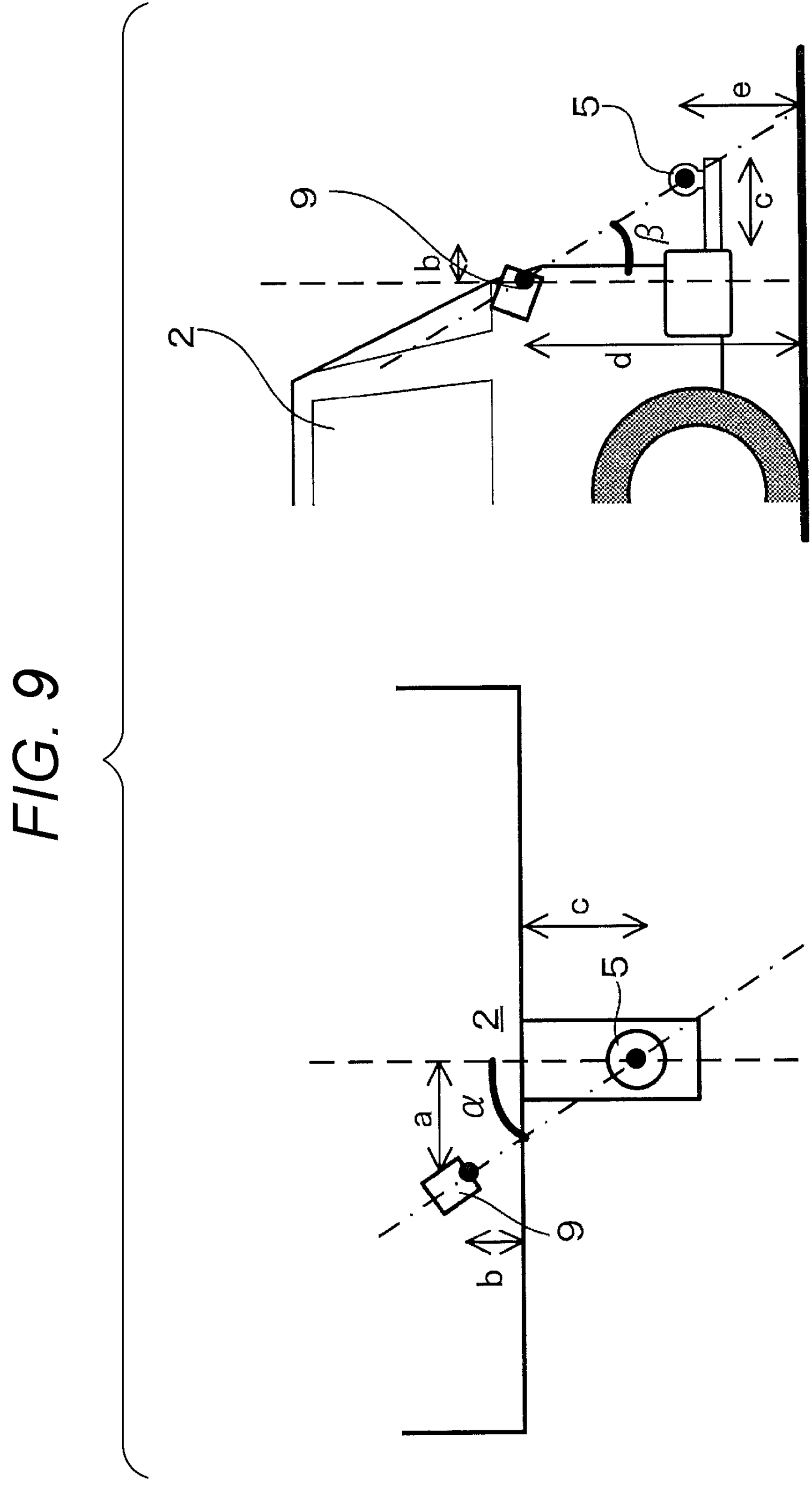
FIG. 9 is a diagram illustrating a method of calculating a connection point.

As illustrated in FIG. 9, a represents, as viewed from vertically above, an angle formed by a line connecting the rear camera 9 and the hitch ball 5 and a line extending in a longitudinal direction (traveling direction) of the towing vehicle 2; and B represents, as viewed from side (viewed in the vehicle width direction), an angle formed by a line connecting the rear camera 9 and the hitch ball 5 and a line extending in the vertical direction of the towing vehicle 2. Here, based on the information for the positions of the hitch ball 5 and the rear camera 9 acquired in S6, a and B are respectively calculated by equations (1) and (2) below.

$$\alpha = a\ \tan(a/b+c) \tag{1}$$

$$\beta = a\ \tan(b+c/d-e) \tag{2}$$

- a: distance from the rear camera 9 to the hitch ball 5 (i.e., center in the vehicle width) in the vehicle width direction.
- b: distance from the rear end of the towing vehicle 2 to the rear camera 9 in the longitudinal direction.
- c: distance from the rear end of towing vehicle 2 to the hitch ball 5 in the longitudinal direction.
- d: height of the rear camera 9 from the ground surface.
- e: height of the hitch ball 5 from the ground surface.

Figure 10:
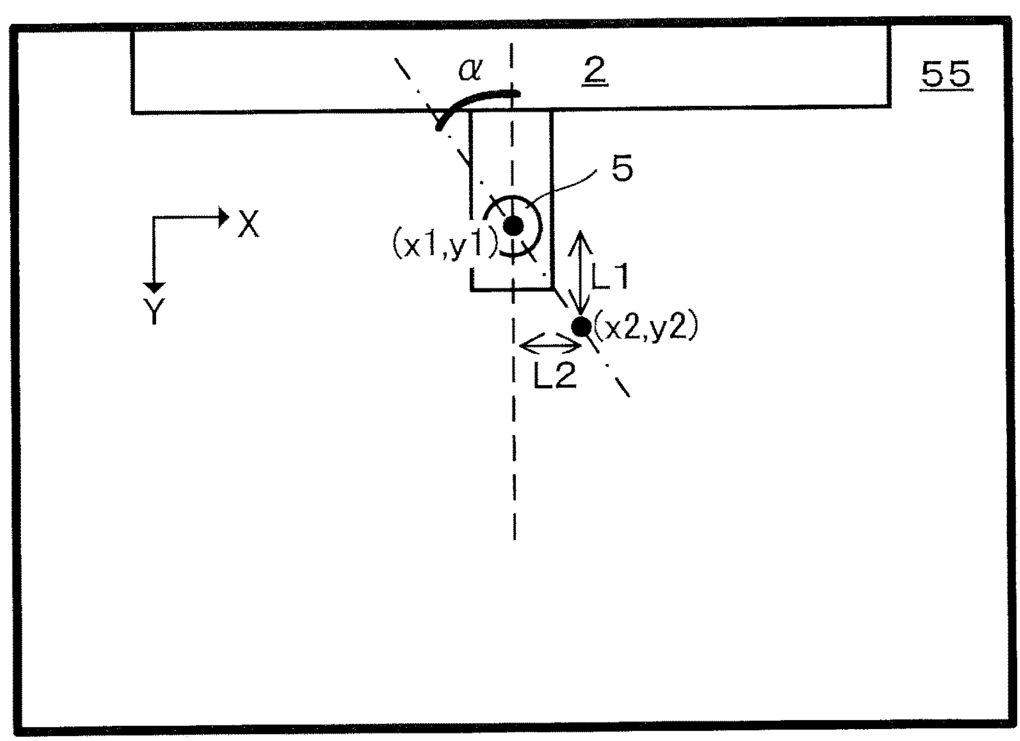
FIG. 10 is a diagram illustrating a method of calculating the connection point.

Then, as illustrated in FIG. 10, when an orthogonal coordinate system is set in an overhead image 55 generated in S5 and the hitch ball 5 in the overhead image 55 is at a position of x1 and y1, the position of the connection point (x2 and y2) in the overhead image 55 is calculated by equations (3) to (6) below.

$$y2 = y1 + L1 \tag{3}$$

$$L1 = d \times \tan\beta \tag{4}$$

$$x2 = x1 + L2 \tag{5}$$

$$L2 = L1 \times \tan\alpha \tag{6}$$

The position (x1 and y1) of the hitch ball 5 in the overhead image 55 may be specified by image recognition processing for the captured image captured by the rear camera 9, or may be estimated based on the information for the position of the hitch ball 5 stored in the vehicle information DB 21. Alternatively, the overhead image 55 may be displayed on the liquid crystal display 15 to allow the user to specify the position of the hitch ball 5. In the examples described above, the position of the hitch ball 5 is calculated as the position of the connection point. Here, when the towing vehicle 2 is approaching the towed vehicle 3 to be connected thereto, the coupler 7 of the towed vehicle 3 is at a position higher than the hitch ball 5.

Thus, "e" in the equations above may be the height of the coupler 7 when the towing vehicle 2 is connected with the towed vehicle 3.

Next, in S8, the CPU 31 generates the icon to be displayed on the position of the connection point in the overhead image. In this embodiment, the icon is at least equal to or slightly greater in size than the hitch ball 5, and has a U-shape open to the coupler 7 (open rearward of the towing vehicle 2). The shape of the icon is not limited to a U-shape, and may be modified as appropriate. For example, the icon may have an annular or triangular shape. The icon is displayed in color distinguishable from the road surface, such as red or green.

Subsequently, in S9, the CPU 31 outputs, to the liquid crystal display 15, the overhead image generated in S5 as the assistance image for assisting in the vehicle operation (second display mode). In the overhead image, the icon generated in S8 is superimposed on the position of the connection point calculated in S7. Specifically, the icon is displayed with its center positioned on the connection point. Alternatively, the liquid crystal display may have two-screen configuration, and the captured image from the rear camera 9 (that has been displayed in the first display mode) may constantly be displayed on one of the two screens, or when the overhead image is displayed, the captured image from the rear camera 9 may be hidden (switched to the display of the overhead image). Further alternatively, in the overhead image, an actual direct image may not be displayed, but an illustration schematically illustrating the towing vehicle 2 and the towed vehicle 3 may be displayed.

Particularly, in this embodiment, the icon indicating the position of the connection point is displayed at a position different from that of the hitch ball 5 in the overhead image. Thus, in order not to confuse the driver of the towing vehicle 2, the towing vehicle 2 and the hitch ball 5 of the towing vehicle 2 are preferably trimmed to be removed from the overhead image and instead, the illustration schematically illustrating the towing vehicle 2 is desirably displayed. Then, until the connection assistance mode ends (S10: YES), the CPU 31 continues to generate the overhead image (S5) based on the captured image captured on the real time basis, calculate the connection point (S6 and S7), and display the overhead image (S8 and S9).

Figure 11:
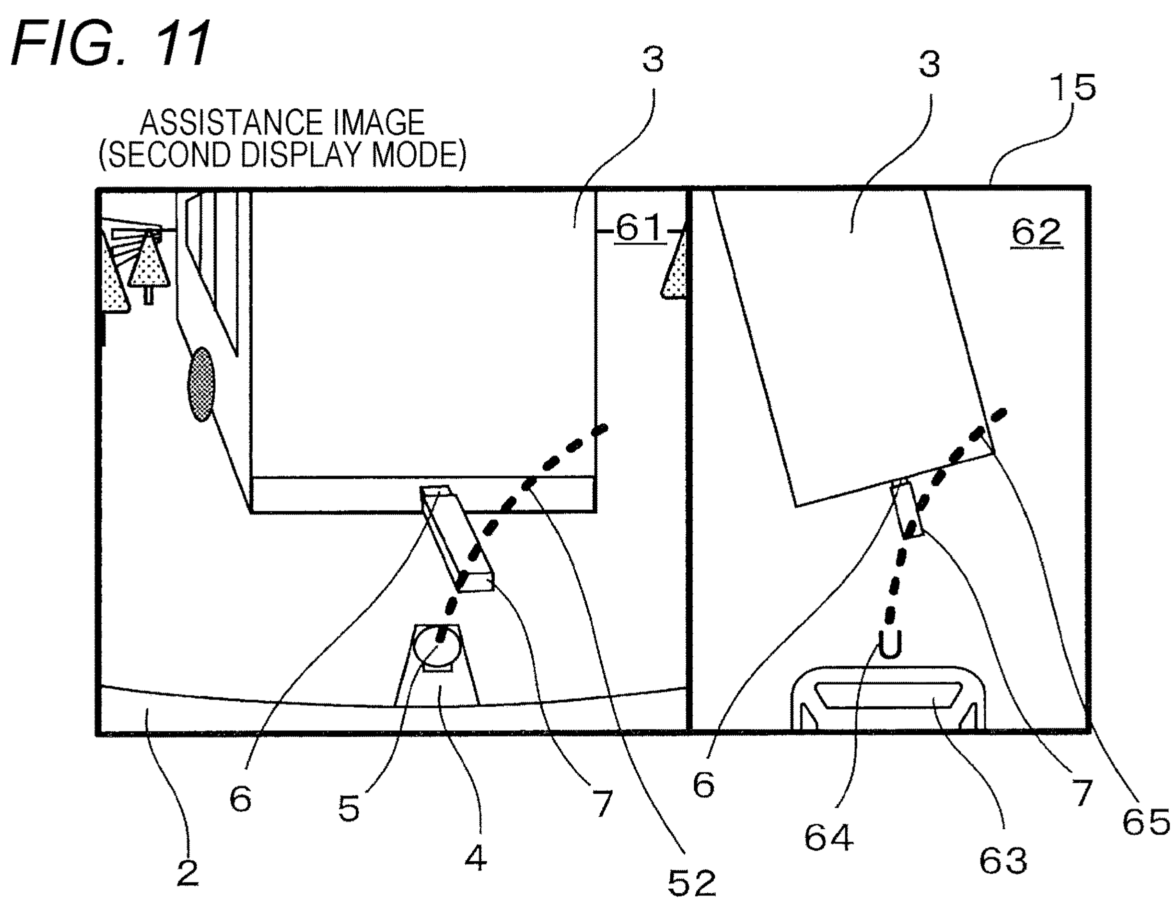
FIG. 11 is a diagram illustrating an example of the assistance image displayed on the liquid crystal display in S9.

FIG. 11 is a diagram illustrating an example of the assistance image displayed on the liquid crystal display 15 in S9. Here, as illustrated in FIG. 11, the assistance image is divided into a first assistance image 61 displayed on the left and a second assistance image 62 displayed on the right, and as the first assistance image 61, the captured image captured by the rear camera 9 is constantly displayed. As the second assistance image 62, the overhead image is displayed. In the overhead image, an illustration 63 schematically illustrating the towing vehicle 2 is displayed at a position corresponding to the towing vehicle 2. Basically, the hitch ball 5 is not displayed, but an illustration of the hitch ball 5 may be displayed along with the connection point. As has been described, the overhead image is displayed on condition that the distance from the towing vehicle 2 to the coupler 7 is smaller than the threshold. Thus, as illustrated in FIG. 11, the overhead image basically includes the towed vehicle 3 together with the connection member 6 and the coupler 7 of the towed vehicle 3.

In the second assistance image 62, an icon 64 is superimposed on the position of the connection point calculated in S7. The icon 64 has the U-shape open to the coupler 7 (open rearward of the towing vehicle 2).

Further, the CPU 31 acquires the current steering angle of the towing vehicle 2 based on the steering angle signal from the steering sensor 26, calculates the moving locus 52 expected of the hitch ball 5 based on the current steering angle, and superimposes the moving locus 52 on the first assistance image 61 before displaying the assistance image 61. Based on the current steering angle acquired, the CPU 31 also calculates a moving locus 65 expected of the connection point, and superimposes the moving locus 65 on the second assistance image 62 before displaying the second assistance image 62. With the moving loci 52 and 65 calculated based on the current steering angle, when the driver displaces the steering angle, the moving loci 52 and 65 are concurrently displaced on the real time basis. In addition to or instead of the moving loci 52 and 65 of the hitch ball 5 and the connection point, the moving locus of the rear wheel area of the towing vehicle 2 may be displayed. The assistance image may not necessarily include the moving loci 52 or 65 but may include the captured image or the overhead image only.

With this configuration, the driver of the towing vehicle 2 views the first assistance image 61 and the second assistance image 62 on the liquid crystal display 15, so as to easily grasp the positional relationship between the hitch ball 5 of the towing vehicle 2 (as the driver's vehicle) and the coupler 7 of the towed vehicle 3 (as the object to be towed by the driver's vehicle). Particularly, the second assistance image 62 corresponds to the overhead image from immediately above downward, the overhead image having the icon 64 displayed on the position of the connection point at which the coupler 7 needs to be positioned to be connected with the hitch ball 5. Thus, the positional relationship is clearer. Then, the driver operates the steering to reverse the towing vehicle 2 to align the position of the hitch ball 5 with the icon 64, so that as illustrated in FIG. 2, the hitch ball 5 and the coupler 7 are connected without a gap. Particularly, with the moving loci 52 and 65 displayed, the driver adjusts the steering angle to cause the moving loci 52 and 65 pass through the coupler 7, thereby facilitating the positioning of the hitch ball 5 with the coupler 7.

When the overhead image is displayed as the second assistance image 62, only a specific area is desirably trimmed from the overhead image generated in S5, and further, the specific area trimmed is desirably enlarged to be displayed. For example, a minimum area, which includes at least the hitch ball 5 and a periphery of a tip of the coupler 7, is trimmed and enlarged to be displayed. As a result, the overhead image is to be enlarged in accordance with the distance from the towing vehicle 2 to the tip of the coupler 7 before being displayed (as the distance from the towing vehicle 2 to the tip of the coupler 7 is smaller, a more enlarged overhead image is to be displayed). With the hitch ball 5 and the icon 64 approaching each other, the positional relationship between the hitch ball 5 and the icon 64 is to be specified in more details based on the overhead image. Alternatively, the user may operate to enlarge or reduce the overhead image.

Subsequently, in S10, the CPU 31 determines whether or not to end the connection assistance mode.

Here, the connection assistance mode may end, for example, on condition that the occupant of the towing vehicle 2 executes a predetermined mode end operation via the operation unit 14, or on condition that the shift lever is positioned to "P" or the engine is turned off. Alternatively, the connection assistance mode may end on condition that the towed vehicle 3 has been connected with the towing vehicle 2. In order to detect whether or not the towing vehicle 2 is connected with the towed vehicle 3, for example, the captured image captured by the rear camera 9 may be used.

On determination that the connection assistance mode has ended (S10: YES), the driving assistance processing program ends. On the other hand, on determination that the connection assistance mode has not ended (S10: NO), the CPU 31 returns to S5 to continue to display the assistance image in the second display mode.

As has been described above in detail, with the driving assistance device 1 according to this embodiment and the computer program executed by the driving assistance device 1, the captured image of the periphery of the towing vehicle 2 is captured by the rear camera 9 of the towing vehicle 2, and based on the captured image, the overhead image from above onto the periphery of the towing vehicle 2 is generated (S5). Concurrently, in the overhead image, the position of the connection point, at which the coupler 7 of the towed vehicle 3 (as the object to be towed by the towing vehicle 2) needs to be positioned to be connected with the hitch ball 5 of the towing vehicle 2, is calculated based on the positional relationship between the rear camera 9 and the hitch ball 5 (S7). Then, the overhead image, including the icon 64 superimposed on the position of the connection point calculated, is displayed as the assistance image for assisting in the vehicle operation (S9). Accordingly, even when the rear camera 9 is not provided immediately above the hitch ball 5, the driver accurately grasps the position of the connection point.

Here, the overhead image is generated by changing the position of the view point with respect to the image as the captured image projected on the ground surface (S5), so that the overhead image clearly displays the road surface with a realistic distance from each obstacle in the periphery of the towing vehicle.

Further, the steering angle of the towing vehicle is acquired, the moving locus expected of the connection point is calculated based on the steering angle, and the moving locus expected of the connection point is superimposed on the overhead image before the overhead image is displayed (S9). Accordingly, adjustment of the steering angle to cause the moving locus to pass through the coupler facilitates the positioning of the hitch ball with the coupler.

Still further, on the liquid crystal display 15, the captured image in addition to the overhead image are displayed as the assistance images (S9). Among the captured image and the overhead image displayed on the liquid crystal display 15, the icon 64 is superimposed on at least the overhead image before the corresponding assistance image is displayed. This configuration allows the driver to accurately grasp the position of the connection point based on the overhead image.

Note that, this disclosure is not limited to the foregoing embodiment, and various improvements and modifications can be made without departing from the scope of this disclosure.

For example, in this embodiment, the assistance images (FIGS. 6 and 11) are displayed on the liquid crystal display 15 in the driving assistance processing program (FIG. 5), but the vehicle control may be performed based on the automatic driving assistance in addition to the assistance images displayed. For example, during the connection assistance mode, the CPU 31 may transmit various assistance information related to the automatic driving assistance, which has been generated in the driving assistance device 1, to the vehicle control ECU 24 through the CAN. Then, the vehicle control ECU 24 may use the various assistance information received to assist the automatic driving after the towing vehicle 2 starts reversing. Examples of the assistance information include a travel locus recommended to connect the hitch ball 5 with the coupler 7, and information indicating a vehicle speed and a steering angle when traveling along the travel locus recommended. In the automatic driving assistance, only the steering operation may be automatic, or the drive source control and the braking control may be automatic too. The towing vehicle 2 may not necessarily include the automatic driving assistance, and may be configured for manual driving only.

The CPU 31 may perform the image recognition processing on the captured image captured by the rear camera 9 to determine whether or not the towed vehicle 3 (as the object to be towed) is included in the captured image, and only on determination that the towed vehicle 3 is included in the captured image, the CPU 31 may proceed to S5 and subsequent steps, in other words, the CPU 31 may display the overhead image. Here, based on a difference in brightness between the road surface and a structure on the road surface, the CPU 31 corrects the brightness to detect the towed vehicle 3 in the captured image captured by the rear camera 9. Then, the CPU 31 performs binary code processing for segregating the structure from the image, the geometric processing for correcting distortion, smoothing processing for removing noises from the image, or others to detect a boundary between the road surface and the structure. Then, the CPU 31 performs, for example, known template matching processing or feature point detection processing, so as to determine whether or not the structure on the road surface is the towed vehicle 3 as the object to be towed. The image recognition processing for the captured image is not limited to the example described above, but machine learning may be used.

In S3, instead of the distance from the towing vehicle 2 to the coupler 7, the distance from the towing vehicle 2 to the towed vehicle 3 (more specifically to the tip of the towed vehicle 3) may be used. When the distance (from the towing vehicle 2) to the towed vehicle 3, instead of the distance to the coupler 7, is used, the coupler 7 does not need to be identified. Thus, a sensor, such as a millimeter wave radar or a laser sensor, may be mounted on the towing vehicle 2 and used to detect the distance (from the towing vehicle 2) to the towed vehicle 3.

Further, in this embodiment, when the assistance image is displayed in the second display mode, the icon 64 indicating the position of the connection point is displayed only in the overhead image, but may also be displayed in the captured image. Note that, when the icon 64 is displayed in the captured image too, the gap between the hitch ball and the connection point in the captured image is desirably taken into consideration.

In this embodiment, when the assistance image is displayed in the second display mode, instead of the actual direct image, the illustration schematically illustrating the towing vehicle 2 is displayed in the overhead image. Alternatively, the actual direct image of the towing vehicle 2 may be displayed in the overhead image.

In this embodiment, the driving assistance processing program (FIG. 5) is processed by the driving assistance ECU 23 of the driving assistance device 1, but may be processed by any other functional units. The driving assistance processing program may be processed by, for example, a control unit of the liquid crystal display 15, the vehicle control ECU, a control unit of the navigation device, or any other on-vehicle devices.

A driving assistance device configured to assist a driver of a towing vehicle in vehicle operation includes: a captured image acquisition unit configured to acquire a captured image of a periphery of the towing vehicle, the captured image captured by an image capture device of the towing vehicle; an overhead image generation unit configured to, based on the captured image, generate an overhead image from above onto the periphery of the towing vehicle; a point calculation unit configured to calculate, in the overhead image, a position of a connection point for connecting a hitch ball of the towing vehicle with a coupler of a towed vehicle as an object to be towed by the towing vehicle; and an image display unit configured to display, on an image display device in the towing vehicle, the overhead image having an icon superimposed on the position of the connection point as an assistance image for assisting the driver in vehicle operation. In the driving assistance device, the point calculation unit calculates the position of the connection point in the overhead image based on a positional relationship between the image capture device and the hitch ball.

With this configuration, the driving assistance device according to an aspect of this disclosure calculates the position of the connection point in the overhead image based on the positional relationship between the image capture device and the hitch ball, and displays the icon at the position of the connection point calculated, so as to enable the driver to accurately grasp the position of the connection point even when the image capture device is not provided immediately above the hitch ball.

In the driving assistance device, the overhead image generation unit generates the overhead image by changing a position of the view point with respect to an image as the captured image projected on a ground surface.

With this configuration, the driving assistance device according to this disclosure generates the overhead image by changing the position of the view point with respect to the image as the captured image projected on the ground surface (S5), so that the overhead image clearly displays the road surface with the realistic distance from each obstacle in the periphery of the towing vehicle.

The driving assistance device further includes a steering angle acquisition unit configured to acquire a steering angle of the towing vehicle, and a locus calculation unit configured to calculate a moving locus expected of the connection point based on the steering angle. Then, the image display unit superimposes the moving locus expected of the connection point on the overhead image, before displaying the overhead image.

With this configuration, the driving assistance device according to this disclosure acquires the steering angle of the towing vehicle, calculates the moving locus expected of the connection point based on the steering angle, and superimposes the moving locus expected of the connection point on the overhead image before displaying the overhead image (S9). Accordingly, the adjustment of the steering angle to cause the moving locus to pass through the coupler facilitates the positioning of the hitch ball with the coupler.

In the driving assistance device, the image display unit displays, on the image display device, the captured image in addition to the overhead image as the assistance images, and among the captured image and the overhead image, each displayed on the image display device, the image display unit superimposes the icon on at least the overhead image, before displaying the corresponding assistance image.

With this configuration, the driving assistance device according to this disclosure displays, on the liquid crystal display 15, the captured image in addition to the overhead image as the assistance images (S9); and among the captured image and the overhead image displayed on the liquid crystal display 15, the driving assistance device superimposes the icon 64 on at least the overhead image before displaying the corresponding assistance image. This configuration allows the driver to accurately grasp the position of the connection point based on the overhead image.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A driving assistance device configured to assist a driver of a towing vehicle in vehicle operation, the driving assistance device comprising:

a captured image acquisition unit configured to acquire a captured image of a periphery of the towing vehicle, the captured image captured by an image capture device of the towing vehicle;

an overhead image generation unit configured to, based on the captured image, generate an overhead image from above onto the periphery of the towing vehicle;

a point calculation unit configured to calculate, in the overhead image, a position of a connection point for connecting a hitch ball of the towing vehicle with a coupler of a towed vehicle as an object to be towed by the towing vehicle; and an image display unit configured to display, on an image display device in the towing vehicle, the overhead image having an icon superimposed on the position of the connection point as an assistance image for assisting the driver in vehicle operation, wherein the point calculation unit calculates the position of the connection point in the overhead image based on a positional relationship between the image capture device and the hitch ball, wherein the overhead image generation unit generates the overhead image by changing a position of a view point with respect to an image as the captured image projected on a ground surface, and wherein, in order to convert the captured image to the image from a virtual view point, the overhead image generation unit converts each coordinate in a captured image coordinate system set along a plane perpendicular to the optical axis of the image capture device, first to the corresponding coordinate in a ground surface coordinate system set along the ground surface, and then to the corresponding coordinate in an overhead image coordinate system.

2. The driving assistance device according to claim 1, further comprising:

a steering angle acquisition unit configured to acquire a current steering angle of the towing vehicle; and a locus calculation unit configured to calculate a moving locus expected of the connection point based on the current steering angle, wherein the image display unit superimposes the moving locus expected of the connection point on the overhead image before displaying the overhead image.

3. The driving assistance device according to claim 1, wherein the image display unit displays, on the image display device, the captured image and the overhead image as the assistance images, and among the captured image and the overhead image, each displayed on the image display device, the image display unit superimposes the icon on at least the overhead image before displaying a corresponding one of the assistance images.

* * * * *